July 19, 1938. J. C. HEINTZ 2,124,111
TIRE RIM
Filed Sept. 13, 1937
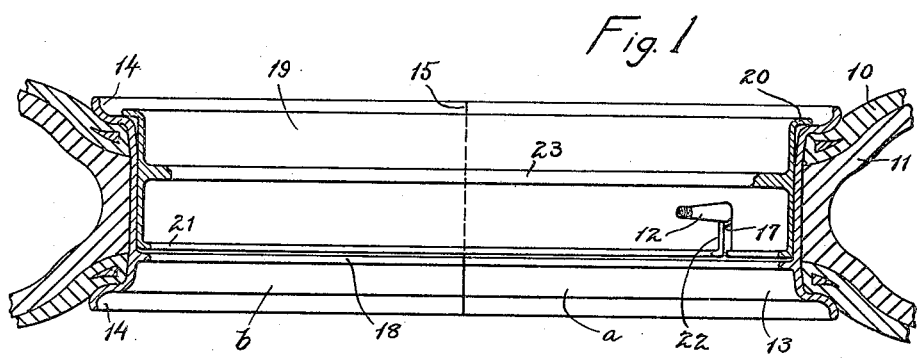
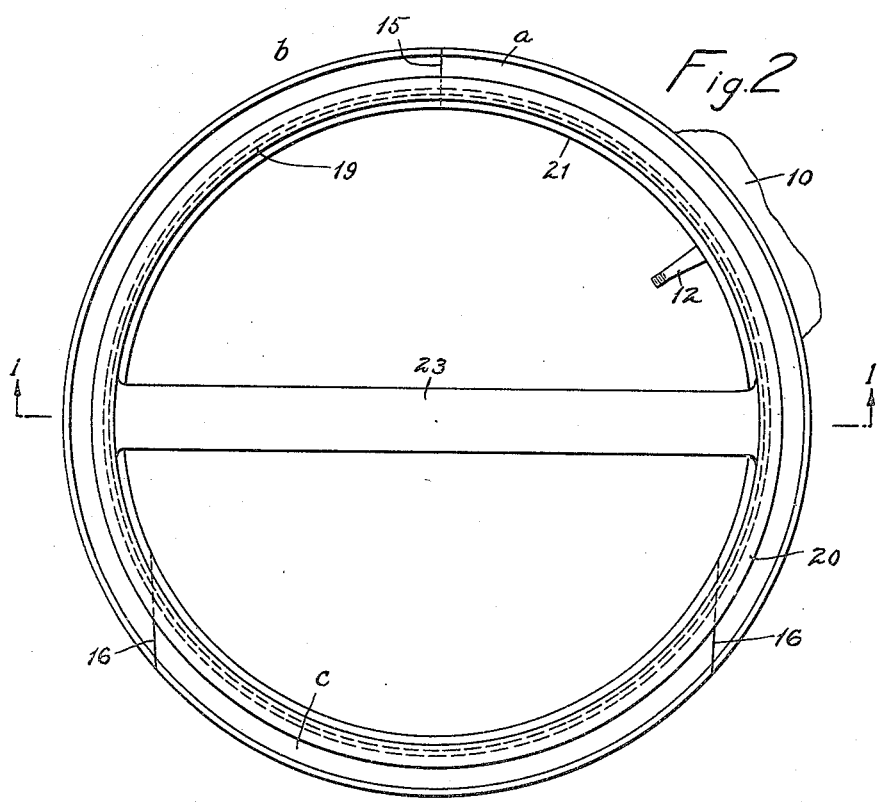
Inventor,
J. C. Heintz,
By Robert M. Pierson.
Attorney

UNITED STATES PATENT OFFICE 2,124,111

TIRE RIM

James C. Heintz, Lakewood, Ohio

Application September 13, 1937, Serial No. 163,510

4 Claims. (Cl. 18—18)

This invention relates to rims for mounting a pneumatic tire during vulcanization in the course of a retreading operation, and also if desired during the partial or complete removal of the old tread preliminary to retreading.

The primary object of the invention is to save time and labor in the application of the rim to the tire and its removal therefrom, and to provide increased safety by guarding against collapse or the possibility of blowing the tire off the rim.

Of the accompanying drawing, Fig. 1 is a diametric section and elevation showing a curing rim embodying my invention, with a pneumatic tire mounted thereon.

Fig. 2 is a top plan view.

In the drawing, 10 is a tire casing to whose inner periphery the rim is applied, and 11 is a hollow distensible rubber core or curing bag therein provided with an inwardly projecting valve stem 12. The rim comprises two annular members, of which the body member 13 is formed with tire-bead retaining flanges 14 and is transversely split in three places to divide it into a pair of contiguous segments $a$ and $b$ whose adjacent ends substantially meet in a radial joint 15, and a third or key segment $c$ whose ends abut the other ends of the segments $a$ and $b$ in semi-tangent joints 16. The valve stem 12 projects through a hole 17 in the base of the segment $b$. Member 13 is, preferably, further formed near its lower edge with an annular, inwardly-projecting flange 18 serving to stiffen the segments and also acting as a ledge for receiving the end of a prying tool or equivalent means for dislodging the tire and its rim from the mold when a rubber tread has been vulcanized upon the tire.

The second member of the rim is a continuous inner locking ring 19 having an outer surface which is cylindrical or nearly so, to fit the complemental inner cylindrical surface of the rim member 13. Member 19 is formed with an outwardly-projecting marginal flange 20 at its upper edge, acting as a stop against the base portion of the upper flange 14, a lower stiffening flange 21 and an open-ended slot or U-shaped recess 22 for registering with the hole 17 in the rim segment $a$ and receiving the valve stem 12. It is further provided with a diametrically placed handle bar 23 which may be secured to opposite points on the ring in a suitable manner as by welding.

In the operation of my invention, when a used tire casing to which a raw tread band has been applied for a retreading or recapping operation is to be vulcanized in a mold, a curing bag 11 is inserted and the curing rim is then applied to the inner periphery of the assembly by fitting the segment $a$ of rim member 13 to the base and beads of the casing, with the valve stem 12 projecting inwardly through the hole 17 in said segment, the segment $b$ is next applied in a similar manner against one end of the segment $a$, circumferentially closing the joint 15 as near as possible, and finally the key segment $c$ is fitted to the tire between the ends of the segments $a$ and $b$. The locking ring 19 is then grasped by the handle 23, its slot 22 circumferentially registered with the valve stem, and it is telescopically slid within the body member 13, wedging outwardly the segments of said member against the tire base until the stop flange 20 on the locking ring meets the upper bead flange on the body member. The assembly of tire casing, curing bag and rim is then ready for insertion in a retread vulcanizer, followed by inflation of the bag 11 and vulcanization of the tread.

The assembling of the rim with the tire and its removal therefrom after vulcanization are more quickly and easily performed than with the ordinary flat-base curing rim having a detachable side ring, and the rim is safer in use for, with the continuous ring 19 in place, there is no possibility of radial collapse, and since the flanges 14 of each of the segments of the rim member 13 are integral with the bases of said segments, the tire beads cannot laterally blow off.

If desired, this rim can also be used in place of the ordinary wheel rim for rotatably mounting a tire during the partial or complete removal of the old tread, cementing, and application of the new raw tread preliminary to vulcanization, thereby dispensing with ordinary air tubes and the time and labor of mounting and dismounting for the preliminary operations. In that case the tire casing, containing a curing bag, remains on the rim through all stages of its treatment.

I claim:

1. A curing rim for pneumatic tire retreading comprising a segmental annular body member formed with an intermediate base and marginal tire-bead flanges, and a continuous locking ring telescopically fitted within the base of said member.

2. A rim according to claim 1 in which the locking ring has a substantially diametric handle bar.

3. A pneumatic-tire curing rim comprising an annular body member consisting of a pair of contiguous segments and an interposed key segment, each having an intermediate base portion and a pair of integral bead flanges, and a continuous inner locking ring telescopically fitted within said body member, against the base portions of its segments.

4. A curing rim according to claim 3 in which one edge of the locking ring is formed with an outwardly extending stop flange to engage the adjacent bead flange of the body member.

JAMES C. HEINTZ.